July 17, 1962

D. C. VEEDER 3,044,474

EGG WASHER

Filed June 10, 1959

David C. Veeder
INVENTOR.

BY *Clarence A. O'Brien*
*and Harvey B. Jacobson*
Attorneys

July 17, 1962
D. C. VEEDER
3,044,474
EGG WASHER
Filed June 10, 1959
2 Sheets-Sheet 2
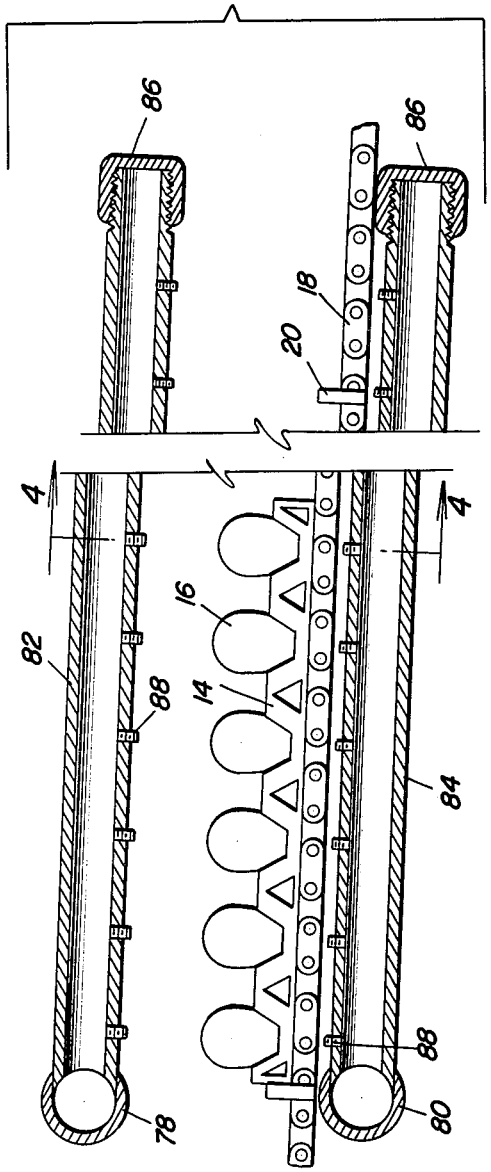
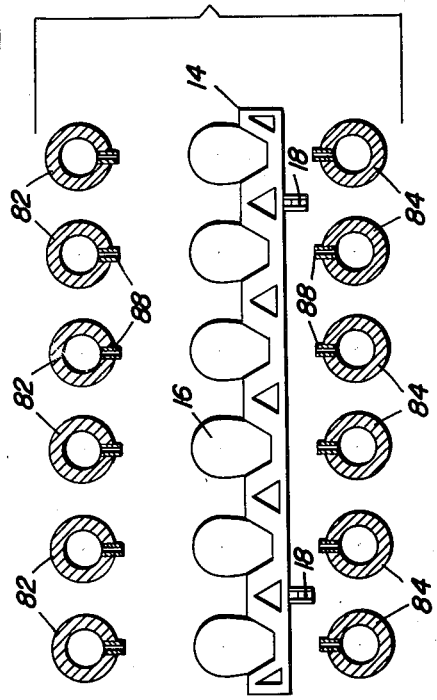
David C. Veeder
INVENTOR

United States Patent Office 3,044,474
Patented July 17, 1962

3,044,474
EGG WASHER
David C. Veeder, 130 Indian Head Road,
Toms River, N.J.
Filed June 10, 1959, Ser. No. 819,280
8 Claims. (Cl. 134—73)

The present invention generally relates to an egg washing machine and more particularly to such an egg washer that sequentially sprays the eggs, submerges the eggs below a cleaning solution level while transporting the eggs through the cleaning solution, sprays the eggs a second time and then transports the eggs through a high pressure spray from both the bottom and the top and subsequently removes the eggs from the washer.

The washing of eggs has been a problem for many years in view of the delicate nature of eggs. There have been many machines for washing eggs most of which employ some type of brushing or scrubbing action which quite often destroys the egg by breaking the shell and has generally been found to be too expensive for economical operation. The present invention has for its primary object the provision of an egg washer in which the eggs are not subjected to any scrubbing or brushing action except for that cleaning action afforded by a spray of water or other cleaning solution together with passage of the eggs through a bath of cleaning solution.

The present invention generally incorporates an elongated endless conveyor system which initially takes the flats on which the eggs are mounted under a spray and then through a bath of cleaning solution while submerged below the surface thereof, under a second spray and then into an elongated high pressure spraying chamber in which the eggs are sprayed from both the bottom and the top as they move through this portion of the machine. The eggs are set onto the flat in a point down position and each flat normally contains 30 or more eggs with the flat usually holding 36 eggs. The flats are constructed of plastic material that is impervious to the cleaning solution and is skeletonized in that relatively small areas of the egg are engaged by the flats thus enabling the cleaning solution to effectively clean the egg.

Another important object of the present invention is to provide an egg washer which not only effectively washes the eggs but also is constructed of readily obtainable components for rendering the cost of the egg washer within the price range of relatively small volume egg producers with the device being substantially trouble free, simple in operation and relatively inexpensive to maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged detailed sectional view showing the structural arrangement of the high pressure above and below spray; and FIGURE 4 is a transverse, sectional view taken substantially upon a plane passing along section line 4—4 of FIGURE 3 illustrating further structural details of this portion of the egg washer.

Figure 1:
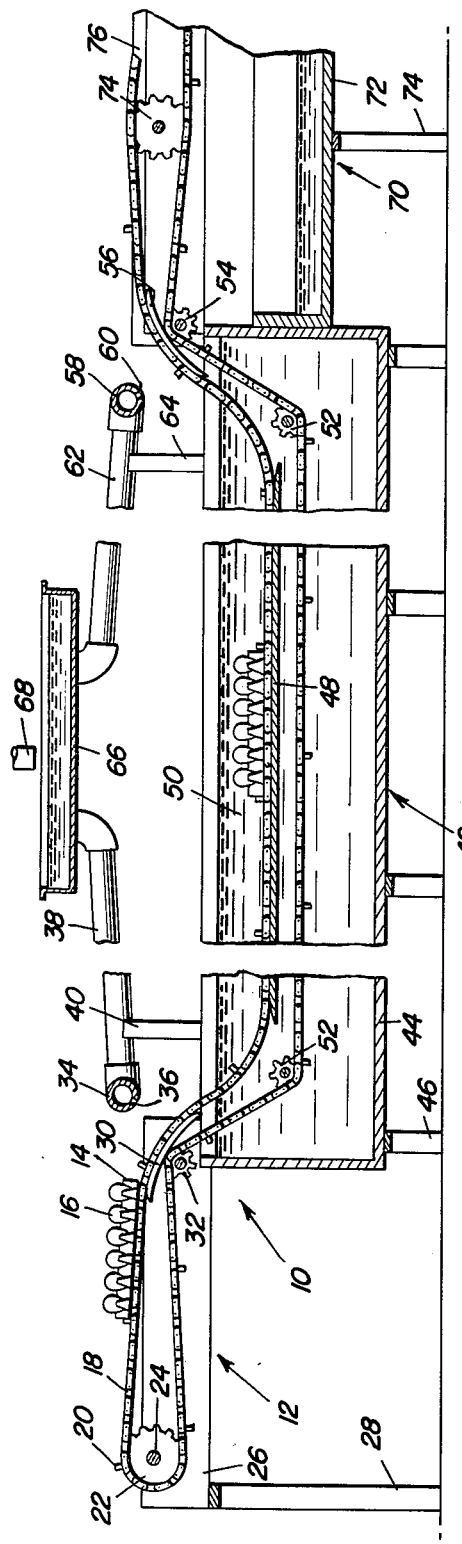
FIGURE 1 is a longitudinal sectional schematic view of a portion of the egg washer illustrating the feed-on portion, the initial spraying portion, the submersion bath and the second spraying portion.
Figure 2:
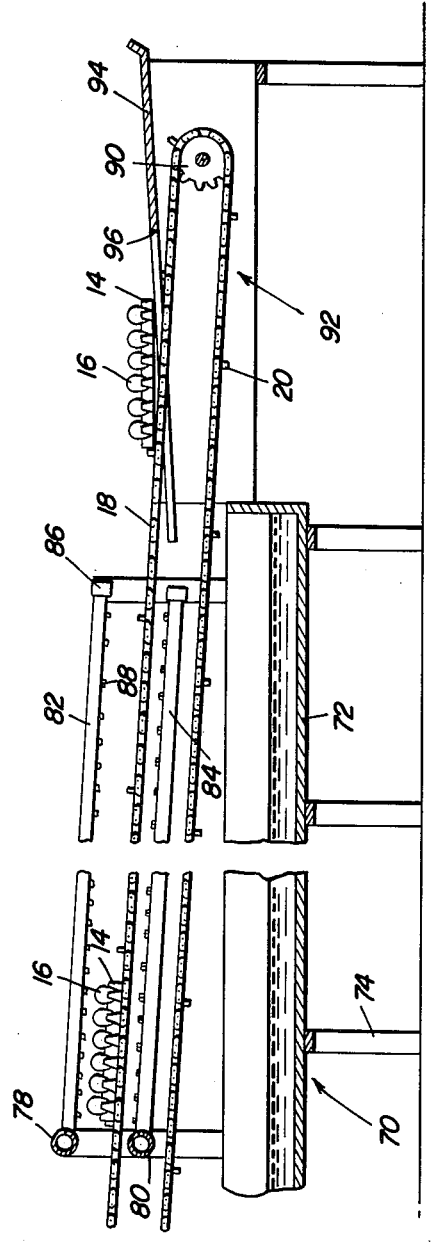
FIGURE 2 is a sectional view similar to FIGURE 1 and showing the high pressure above and below spray and the take-off area of the egg washer.

Referring now to the drawings, the numeral 10 generally designates the egg washer of the present invention which includes a table area generally designated by the numeral 12 on which the flats 14 containing the eggs 16 are orientated on a pair of endless conveying chains 18 which have upwardly projecting pins 20 thereon at spaced intervals for engagement with the flats 14 thus causing the flats 14 to move along the upper surface of the pair of chains 18. The chains 18 pass over end sprockets 22 mounted on a shaft 24 supported by frame elements 26 which is supported by leg members 28. The shaft may be driven by any suitable motor and may be adjustable for varying the tension on the chain 18. The structural details are unimportant to the invention and are omitted for the purpose of clarity. Adjacent the inner end of the loading area 12 is a guide plate which is arcuately and downwardly curved with the guide plate being designated by numeral 30 for supporting the upper run of the endless chain conveyors 18 as it descends to a lower level. The lower run of the endless chain conveyors 18 is supported by an idler sprocket 32.

Disposed in alignment with the loading area 12 is a transverse spray pipe 34 having a plurality of spray orifices 36 therein for directing a spray of cleaning solution onto the eggs 16 as they proceed downwardly over the guide plate 30. The transverse pipe 34 is connected to a longitudinal pipe 38 which is supported by frame elements 40.

Disposed in alignment with the loading area 12 is a submersion bath tank generally designated by numeral 42 and including an enlarged receptacle or tank 44 supported by legs 46. The tank 44 is provided with a horizontally extending plate 48 which forms a rest for the upper run of the conveyor chains 18 whereby the eggs 16 will be moved longitudinally from one end of the tank 44 to the other while the chains rest on the plate 48 and when the eggs are submerged below the upper surface of cleaning solution 50 in the tank 44. Adjacent each end of the tank 44, the lower run of the sprocket chains are engaged on their upper surface by idler sprockets 52 for forming adequate guides for the sprocket chains.

At the discharge end of the tank 44, the conveyor chains extend upwardly with the lower run passing over an idler sprocket 54 and the upper run passing over a curved plate 56 similar to the guide plate 30 and accomplishing the same purpose. Disposed in overlying relation to the plate 56 is a transverse spray pipe 58 having a plurality of openings 60 therein for spraying cleaning solution onto the eggs as they pass over the guide plate 56 thus giving the eggs a final rinse after passing through the solution bath. The pipe 58 is connected to the longitudinally extending pipe 62 supported by the frame member 64 with both the pipes 38 and 62 extending into an overhead tank 66 provided with a discharge supply pipe 68 extending into the open upper end thereof for providing cleaning solution for discharge through the orifices 36 and 60 by the force of gravity. The tank 66 may have a filter and the solution may be pumped into the tank 66 by any suitable pump connected with the tank 44 and a filter may be provided for removing dirt or other foreign particles washed off of the eggs so that the cleaning solution recirculated will be relatively clean.

In alignment with the submersion tank area 42, there is provided a high pressure spray area generally designated by numeral 70 and including a relatively shallow drain tank 72 supported on framing legs 74. The sprocket chain conveyors 18 extend over idler sprocket gears 74 supported by framing elements 76 which also support transversely extending pipes or manifolds 78 and 80 at the entrance end of the high pressure spray area. Extending longitudinally and in an inclined manner from the transverse manifold pipes 78 and 80 is a plurality of longitudinally extending upper spray pipes 82 and a plurality of lower spray pipes 84 each of which is provided with an end cap 86 and a plurality of orifices 88 extending into and through the wall of the pipes 82 and 84 respectively and facing downwardly and upwardly respectively for discharging a fine high pressure spray of cleaning solution onto the bottom and onto the tops of the eggs 16. In other words, the eggs are sprayed by high pressure spray from both above and below as they pass longitudinally between the spray pipe 82 and 84. As illustrated in FIGURE 4, the spray pipes are relatively closely spaced and there is a spray pipe above and below each row of eggs 16 on the flats 14. The upper run of the sprocket chain 18 proceeds between the spray pipes 82 and is supported between the sprocket gear 74 and an end sprocket gear 90 disposed longitudinally outwardly of the high pressure spray area 70. The tank 72 receives the cleaning solution as it drips from the eggs and the entire high pressure spray area is preferably covered with a canopy or covering (not shown) in order to prevent spray or mist from being discharged to external areas and for confining the spray or mist formed thereby to the area of the eggs and for discharge back into the tank 72 whereby the cleaning solution may be filtered and re-used thus providing a saving in the cleaning solution.

Located in longitudinal alignment outwardly of the high pressure cleaning area is a removal area generally designated by numeral 92 which includes an inclined table surface 94 having an incline in opposition to the incline to the conveyor chains 18 with the inner end of the table surface having slots 96 which permit the inner ends of the table top 94 to extend below the upper run of the conveyor chains 18. Thus, when the flats 14 proceed with the conveyor chain, the leading edge thereof will engage the portion of the table top 94 between the slots 96 and will ride upwardly on the table top surface 94 until the projection 20 is released from the rear edge of the flat 14. Thus, a subsequent flat may come along and engage the flat already deposited and push the already deposited flat onto the table top surface thus enabling several flats to be removed from the chain conveyors before it is necessary to remove the flats from the table top surface. The removal area 92 will be disposed in a room separate from the cleaning areas so that the eggs on the flats may be stored for drying and subsequently placed in cases or otherwise subjected to further operation such as candling, grading, inspection or the like.

With the present invention, there is provided an egg washer in which a single continuous conveying mechanism is employed for subjecting the eggs sequentially to a high volume low pressure gravity spray, movement while submerged through a bath of cleaning solution, a second high volume low pressure spray or rinse of the eggs and a subsequent high pressure spray washing of the eggs simultaneously from above and below in which all of the components employed are of rather conventional construction with their being very little complex machinery thereby requiring very little repair and upkeep.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An egg washer comprising a longitudinally extending conveying means, a loading area for eggs at one end of said conveying means, a first spray pipe adjacent the loading area of the conveying means and extending transversely of the conveying means, a fluid reservoir above said first spray pipe, means for conducting fluid by gravitational forces from the reservoir to said first spray pipe, an elongated bath tank in longitudinally aligned relation to the loading area with the conveying means extending longitudinally under the top level of a liquid cleaning solution therein for immersing the eggs carried by the conveying means while passing through the bath tank, a second spray pipe disposed in overlying relation to and transversely to the conveying means at the discharge end of the bath tank, means connecting said reservoir to said second spray pipe for subjecting the eggs to a gravity flow spray rinse, high pressure spray means located in longitudinal alignment with and beyond the bath tank for subjecting the eggs passing therethrough to a higher pressure spray, said higher pressure spray means located both above and below the eggs, and a take-off means for the conveying means in longitudinal alignment with the high pressure spray means whereby the eggs are automatically removed from the conveying means onto the take-off means.

2. The structure as defined in claim 1 wherein said conveying means includes an elongated continuous flexible conveyor adapted to receive egg supporting flats thereon, said flexible conveyor having means engaging the flats for moving the flats with the conveyor, an arcuate guide plate underlying the upper run of the conveyor for passing the upper run of the conveyor downwardly into the bath tank, said first spray pipe being located in overlying relation to the arcuate guide plate and inwardly of the bath tank whereby the cleaning solution discharged by the spray pipe will be discharged into the tank.

3. The structure defined in claim 1 wherein said bath tank is provided with a horizontally extending support plate disposed below the surface level of the cleaning solution with the upper run of the conveyor means sliding along the support plate thereby forming a support for the egg flats while the eggs pass through the bath.

4. The structure defined in claim 1 wherein the discharge end of the bath tank is provided with an arcuate plate over which the upper run of the conveyor means passes, said second spray pipe being located above the discharge end of the bath tank and discharging cleaning solution onto the eggs as they pass over the guide plate with the cleaning solution draining back into the bath tank.

5. The structure as defined in claim 1 wherein said high pressure spraying means includes a drainage tank, a pair of transverse manifold pipes located in vertically spaced relation to each other on opposite sides of the conveying means and in an overlying relation to one end of the drainage tank, a plurality of longitudinally extending parallel high pressure spray pipes disposed in laterally spaced relation equivalent to the laterally spaced relation of the rows of eggs on the flats with the high pressure spray pipes being located above and below the conveyor means and above and below the flats with the eggs thereon, a plurality of nozzle orifices in each of said longitudinally extending spray pipes for providing a high pressure discharge spray from a series of longitudinally spaced nozzles onto both the bottom and top of the egg thereby thoroughly cleaning the eggs with the cleaning solution being discharged back into the drainage tank.

6. The combination of claim 1 wherein said take-off means includes a table top inclined downwardly in intersecting relation to the conveyor means and provided with a slot for permitting passage of the conveyor means therethrough whereby the leading edge of the flats will engage the oppositely inclined surface of the table top and be forced upwardly onto the table top as the conveyor means passes the table top with subsequent flats being capable of pushing the preceding flat further onto the table top.

7. The combination of claim 1 wherein said conveying means comprises a flexible chain having generally flat upper surfaces, spaced lugs on said chain projecting upwardly from said surfaces, perforated egg containers carried on said surfaces and engaging said lugs, said containers having a plurality of pockets therein for receiving and retaining eggs in an upright position.

8. The combination of claim 7 wherein said reservoir is vented to atmosphere.

References Cited in the file of this patent

UNITED STATES PATENTS

| | | |
|---|---|---|
| 708,738 | Schirmer | Sept. 9, 1902 |
| 740,758 | Hutcheson | Oct. 6, 1903 |
| 1,019,111 | Wright | Mar. 5, 1912 |
| 1,046,058 | Duell | Dec. 3, 1912 |
| 1,512,918 | Forsgard | Oct. 28, 1924 |
| 1,964,275 | Secondo | June 26, 1934 |
| 2,770,242 | Tubiolo | Nov. 13, 1956 |